United States Patent
Ma et al.

(10) Patent No.: US 8,995,309 B2
(45) Date of Patent: Mar. 31, 2015

(54) RADIO FREQUENCY SIGNAL LOOPBACK METHOD AND OUTDOOR UNIT

(75) Inventors: Yingdong Ma, Chengdu (CN); Lin Huang, Chengdu (CN); Songlin Shuai, Chengdu (CN); Hua Cai, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 13/565,499

(22) Filed: Aug. 2, 2012

(65) Prior Publication Data

US 2012/0294198 A1     Nov. 22, 2012

Related U.S. Application Data

(63) Continuation of application No. PCT/CN2011/072566, filed on Apr. 9, 2011.

(30) Foreign Application Priority Data

Apr. 23, 2010 (CN) .......................... 2010 1 0158494

(51) Int. Cl.
*H04B 1/38* (2006.01)
*H04M 11/00* (2006.01)
(Continued)

(52) U.S. Cl.
CPC .............. *H04B 1/525* (2013.01); *H04W 88/085* (2013.01)
USPC ............................ 370/276; 375/222; 455/570

(58) Field of Classification Search
CPC .......... H04B 10/035; H04M 2203/055; H04Q 2213/13217; H04L 1/243

USPC .......... 455/127.1, 456, 570; 375/222; 359/132
See application file for complete search history.

(56) References Cited

U.S. PATENT DOCUMENTS

| | | | |
|---|---|---|---|
| 5,442,811 A | 8/1995 | Kobayashi et al. | |
| 5,969,837 A * | 10/1999 | Farber et al. | 379/56.2 |
| 6,169,912 B1 * | 1/2001 | Zuckerman | 455/570 |

(Continued)

FOREIGN PATENT DOCUMENTS

| | | |
|---|---|---|
| CN | 201091070 Y | 7/2008 |
| CN | 101374285 A | 2/2009 |

(Continued)

OTHER PUBLICATIONS

Partial Translation of Search Report dated Aug. 26, 2012 in connection with Chinese Patent Application No. 201010158494.8, 5 pages.

(Continued)

*Primary Examiner* — Andrew Lai
*Assistant Examiner* — Chuong M Nguyen

(57) ABSTRACT

An outdoor unit includes: a transmitting module configured to transmit a signal; a splitter module configured to split the signal into two branches, where one branch is input into a amplifier, and the other branch is input into a duplexer; and the amplifier is configured to amplify the signal from the splitter module; the duplexer is configured to filter the signal from the splitter module and then output the signal to an antenna, and filter an external signal received by the antenna and then output the external signal to a combining module; the combining module is configured to combine the signal output by the amplifier with the signal output by the duplexer, and then output a combined signal to a receiving module; and the receiving module is configured to receive the combined signal output by the combining module.

5 Claims, 3 Drawing Sheets

(51) Int. Cl.
 *H04M 1/00* (2006.01)
 *H04W 88/08* (2009.01)

(56) References Cited

U.S. PATENT DOCUMENTS

| | | | | |
|---|---|---|---|---|
| 7,123,649 | B1 * | 10/2006 | Smith et al. | 375/222 |
| 2002/0094823 | A1 * | 7/2002 | Suzuki et al. | 455/456 |
| 2005/0221764 | A1 * | 10/2005 | Shen et al. | 455/67.15 |
| 2007/0066250 | A1 * | 3/2007 | Takahashi et al. | 455/127.1 |
| 2009/0167459 | A1 * | 7/2009 | Jakob et al. | 333/129 |
| 2009/0285270 | A1 | 11/2009 | Wong | |

FOREIGN PATENT DOCUMENTS

| | | | | |
|---|---|---|---|---|
| CN | 201252544 | Y * | 6/2009 | H04B 7/22 |
| CN | 201252544 | Y | 6/2009 | |
| CN | 101488842 | A | 7/2009 | |
| CN | 101636923 | A | 1/2010 | |
| CN | 101834625 | A | 9/2010 | |
| JP | 2006197343 | A | 7/2006 | |
| WO | WO 2007/108221 | A1 | 9/2007 | |
| WO | WO 2007/143846 | A1 | 12/2007 | |

OTHER PUBLICATIONS

Written Opinion of the International Searching Authority dated Jul. 7, 2011 in connection with International Patent Application No. PCT/CN2011/072566.

Supplementary European Search Report dated May 8, 2013 in connection with European Patent Application No. EP 11 77 1545.

International Search Report dated Jul. 14, 2011 in connection with International Patent Application No. PCT/CN2011/072566.

* cited by examiner

RADIO FREQUENCY SIGNAL LOOPBACK METHOD AND OUTDOOR UNIT

CROSS-REFERENCE TO RELATED APPLICATIONS

This application is a continuation of International Application No. PCT/CN2011/072566, filed on Apr. 9, 2011, which claims priority to Chinese Patent Application No. 201010158494.8, filed on Apr. 23, 2010, both of which are hereby incorporated by reference in their entireties.

TECHNICAL FIELD

The present invention relates to the field of communications technologies, and in particular, to a radio frequency signal loopback method and an outdoor unit.

BACKGROUND

A digital microwave transfers a data signal in a wireless manner, and a split digital microwave system is formed by two parts: an indoor unit (Indoor Unit, IDU) and an outdoor unit (Outdoor Unit, ODU). A transfer process of a microwave signal in the split digital microwave system includes: An IDU sends an intermediate frequency (IF) signal to an ODU, the ODU performs up-conversion on the IF signal, amplifies the signal, and then transfers the signal to a next ODU through an antenna. After receiving the signal, the next ODU performs down-conversion on the signal, amplifies the signal, and then transfers the signal to another IDU. The IDU demodulates the received signal, and in this way, the transfer of the microwave signal in the split digital microwave system is implemented.

Referring to FIG. 1, an ODU in a split digital microwave system is generally formed by a transmitting module (Tx module) 11, a receiving module (Rx module) 12, and a duplexer (duplexer) 13. The duplexer is formed by a transmitting filter (Tx Filter) 1301 and a receiving filter (Rx Filter) 1302.

In the prior art, loopback of a radio frequency signal is implemented by using a feature that, in the duplexer, attenuation that is performed by the receiving filter (Rx Filter) on a transmission signal is limited. Specifically, in the duplexer, the attenuation that is performed by the receiving filter (Rx Filter) on the transmission signal is limited, and therefore, a radio frequency signal transmitted by the transmitting module (Tx module) is leaked to the receiving module (Rx module) through the duplexer, thus implementing loopback of the radio frequency signal.

The prior art has the following disadvantages:

In the prior art, the duplexer is used to directly leak the transmission signal, so as to implement the loopback of the radio frequency signal, but the duplexer has transmitter-receiver isolation to some extent, therefore, a signal leaked from the radio frequency signal that is sent by the transmitting module (Tx module) to the receiving module through the duplexer generally has small power. Moreover, due to a frequency response characteristic of the receiving filter of the duplexer, when signals with different transmission frequencies and the same transmission power are leaked to an entrance of the receiving module, power of the signals is different, and furthermore, the receiving module requires different minimum receiving power for different service modes. In this way, loopback of signals only at a part of frequencies and in a part of service modes may be implemented.

SUMMARY

Embodiments of the present invention provide a radio frequency signal loopback method and an outdoor unit, so that loopback of a signal at any frequency in a working frequency band and any service mode of an ODU can be implemented.

In view of the preceding, an embodiment of the present invention provides:

an outdoor unit ODU, including: a transmitting module, a receiving module, a splitter module, a combining module, a duplexer, and an amplifier, where the transmitting module is configured to transmit a signal;

the splitter module is configured to split the signal transmitted by the transmitting module into two branches, where one branch of the signal is input to the amplifier, and the other branch of the signal is input to the duplexer;

the amplifier is configured to amplify the signal from the splitter module;

the duplexer is configured to filter the signal from the splitter module and then output the signal to an antenna, and filter an external signal received by the antenna and then output the external signal to the combining module;

the combining module is configured to combine the signal output by the amplifier with the signal output by the duplexer, and then output a combined signal to the receiving module; and the receiving module is configured to receive the combined signal output by the combining module.

A radio frequency signal loopback method, including:

splitting, by a splitter module, a signal to be transmitted;

amplifying, by an amplifier, one branch of the signal split by the splitter module;

filtering, by a duplexer, the other branch of the signal split by the splitter module and then outputting the signal to an antenna, and filtering an external signal received by the antenna and then outputting the external signal to a combining module; and combining, by the combining module, the signal output by the duplexer with the signal amplified by the amplifier, and then outputting a combined signal.

In the embodiments of the present invention, the splitter module in the ODU splits the transmission signal into two branches, where one branch of the signal is input to the amplifier, and the other branch of the signal is input to the duplexer. The amplifier amplifies the signal from the splitter module, and then the combining module combines the signal output by the amplifier with the signal (that is, a signal output after the duplexer filters the signal from the antenna) output by the duplexer and then outputs a combined signal, so that loopback of a signal at any frequency in the working frequency band and any service mode of the ODU can be implemented.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION

Figure 1:
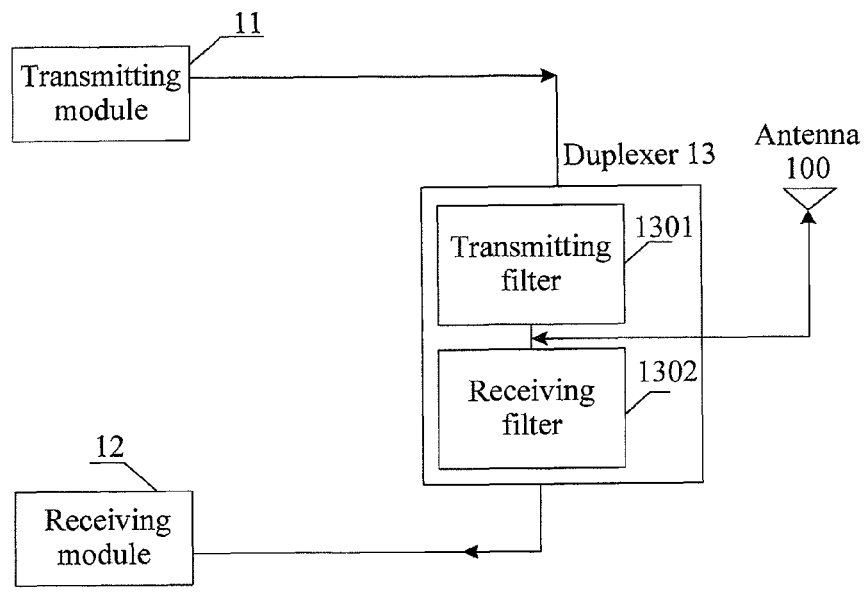
FIG. 1 is a structural diagram of an ODU according to the prior art.
Figure 2:
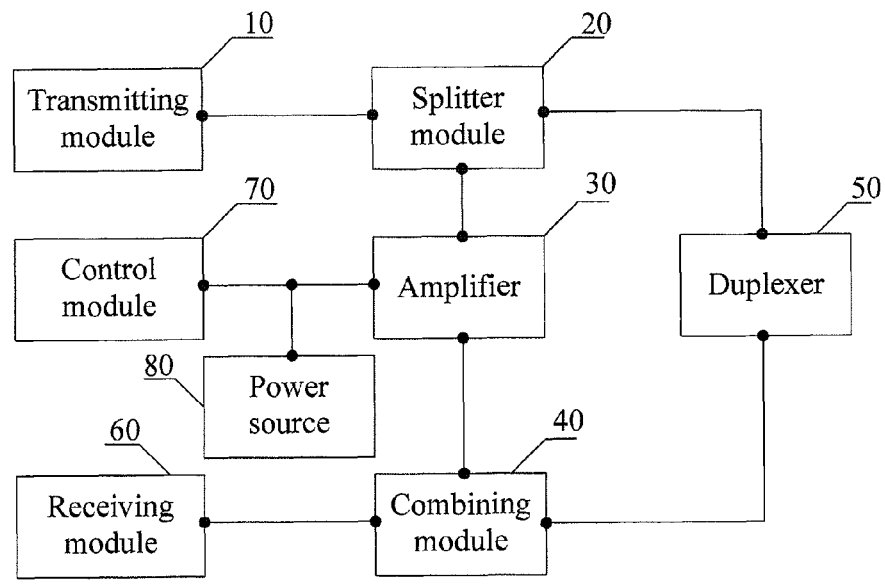
FIG. 2 is a structural diagram of an ODU according to an embodiment of the present invention.

Referring to FIG. 2, an embodiment of the present invention provides an ODU. The ODU includes: a transmitting module 10, a splitter module 20, an amplifier 30, a combining module 40, a duplexer 50, and a receiving module 60, where the transmitting module 10 is configured to transmit a signal;

the splitter module 20 is configured to split the signal transmitted by the transmitting module 10 into two branches, where one branch of the signal is input to the amplifier 30, and the other branch of the signal is input to the duplexer 50;

the amplifier 30 is configured to amplify the signal from the splitter module 20;

the duplexer 50 is configured to filter the signal from the splitter module 20 and then output the signal to an antenna, and filter an external signal received by the antenna and then output the external signal to the combining module 40;

the combining module 40 is configured to combine the signal output by the amplifier 30 with the signal output by the duplexer 50, and output a combined signal to the receiving module 60; specifically, the combining module 40 couples the signal output by the amplifier 30 to an output signal line of the duplexer 50, and the output signal line of the duplexer 50 is connected to the receiving module 60; and the receiving module 60 is configured to receive the combined signal output by the combining module 40.

In order to perform power on/off control on the amplifier, the ODU further includes:

a control module 70, configured to control the amplifier to be connected to a power source 80 when receiving an ODU radio frequency loopback command; and control to disconnect the power source 80 of the amplifier 30 when receiving an ODU radio frequency loopback removal command;

where, the splitter module 20 is a first coupler or a first power divider; and the combining module 40 is a second coupler or a second power divider.

Specifically, the duplexer 50 includes: a receiving filter and a transmitting filter. The transmitting filter is configured to filter the signal from the splitter module 20 and then output the signal to the antenna; and the receiving filter is configured to filter the external signal from the antenna and then output the signal to the combining module 40.

In order to control a gain of the amplifier, the control module 70 is further configured to, after receiving the ODU radio frequency loopback command, control magnitude of a power supply current of the amplifier according to a current service mode. If the current service mode requires larger power of a signal that is looped back to the receiving module 60, the power supply current of the amplifier is controlled to become larger, and in this way, the gain of the amplifier becomes larger, and power of the signal output by the amplifier becomes larger.

In this embodiment of the present invention, the splitter module in the ODU splits the signal transmitted by the transmitting module into two branches, where one branch of the signal is input to the amplifier, and the other branch of the signal is input to the duplexer. The control module controls the power source to supply power to the amplifier when receiving the ODU radio frequency loopback command, and in this way, the amplifier can amplify the signal from the splitter module, and then the combining module combines the signal output by the amplifier with the signal (that is, a signal output after the duplexer filters the signal from the antenna) output by the duplexer and then outputs a combined signal, so that loopback of a signal at any frequency in a working frequency band and any service mode of the ODU can be implemented.

Figure 3:
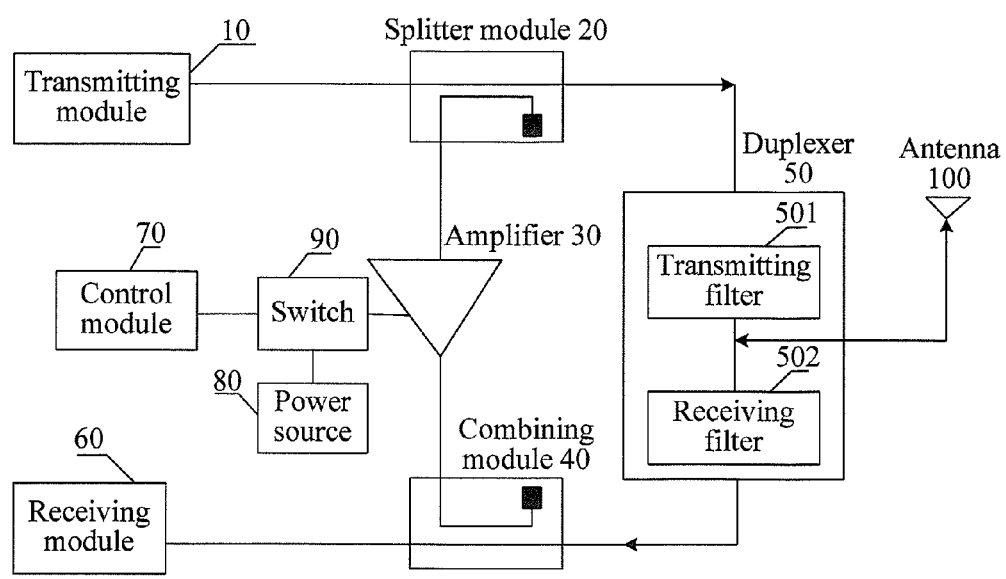
FIG. 3 is a structural diagram of an ODU according to another embodiment of the present invention.

In order to make the technical solutions provided in the present invention clearer, in the following embodiment, composition and a connection relationship of an ODU provided in the present invention are introduced in detail. Specifically, referring to FIG. 3, the ODU includes: a transmitting module 10, a splitter module 20, an amplifier 30, a combining module 40, a duplexer 50, and a receiving module 60, a control module 70, a power source 80, a switch 90, and an antenna 100. The duplexer 50 includes: a transmitting filter 501 and a receiving filter 502. The control module 70 may be a microprogrammed control unit (Microprogrammed Control Unit, MCU).

Specifically, the transmitting module 10 is configured to transmit a signal;

the splitter module 20 is configured to split the signal transmitted by the transmitting module 10 into two branches, where one branch of the signal is input to the amplifier 30, and the other branch of the signal is input to the duplexer 50;

the control module 70 is configured to output a control signal CNL to a switch 90 when receiving an ODU radio frequency loopback command, so that the power source 80 supplies power to the amplifier 30; and output a control signal (Control, CNL) to the switch 90 when receiving an ODU radio frequency loopback removal command, so that the switch 90 turns off power that is supplied by the power source 80 to the amplifier 30;

the amplifier 30 is configured to amplify the signal from the splitter module 20 when the amplifier is connected to the power source 80;

the transmitting filter 501 in the duplexer 50 filters the signal from the splitter module 20 and then outputs the signal to the antenna 100, and the antenna 100 transmits the signal;

the receiving filter 502 in the duplexer 50 filters an external signal received by the antenna and then outputs the external signal to the combining module 40;

the combining module 40 is configured to combine the signal output by the amplifier 30 with the signal output by the duplexer 50, and output a combined signal to the receiving module 60; specifically, the combining module 40 couples the signal output by the amplifier 30 to an output signal line of the duplexer 50, and the output signal line of the duplexer 50 is connected to the receiving module 60; and the receiving module 60 is configured to receive the combined signal output by the combining module 40.

It should be noted that, the amplifier 30 does not work when the power source is turned off, and at this time, an input end and an output end of the amplifier 30 have large isolation, therefore, the signal transmitted by the transmitting module 10 has quite small signal power when entering the receiving module 60 through the amplifier 30, which does not affect normal work of the receiving module 60.

Magnitude of power of a signal looped back to the receiving module 60 may be controlled through the following manners: In a first manner, a gain of the amplifier is controlled to satisfy a power requirement of the signal looped back to the receiving module 60. Specifically, after receiving the ODU radio frequency loopback command, the control module 70 may control magnitude of a power supply current of the amplifier according to a current service mode. If the current service mode requires larger power of the signal looped back to the receiving module 60, the power supply current of the amplifier is controlled to become larger, and in this way, the gain of the amplifier becomes larger, and correspondingly, power of the signal output by the amplifier also becomes larger, so that the power of the signal looped back to the receiving module 60 is larger. In a second manner, the power requirement of the signal looped back to the receiving module 60 is satisfied by selecting the splitter module 20 and the combining module 40. During splitting of the splitter module 20, a part of power of the signal transmitted by the transmitting module 10 needs to be coupled and then input to the amplifier, and if larger power of the signal looped back to the receiving module 60 is required, power of the signal that needs to be input to the amplifier is increased correspondingly. Likewise, when the combining module couples the signal output by the amplifier 30 to the output signal line of the duplexer 50, power of the signal input to the output signal line of the duplexer 50 may be increased, and in this way, the power of the signal looped back to the receiving module 60 is also increased.

The amplifier 30 may be any amplifier, for example, may be a low-noise amplifier, and may also be another type of amplifier, which does not affect implementation of the present invention.

The splitter module 20 is a first coupler or a first power divider; and the combining module 40 is a second coupler or a second power divider.

In this embodiment of the present invention, the splitter module in the ODU splits the transmission signal into two branches, where one branch of the signal is input to the amplifier, and the other branch of the signal is input to the duplexer. The amplifier amplifies the signal from the splitter module, and then the combining module couples the signal output by the amplifier to the output signal line of the duplexer, so that loopback of a signal at any frequency in a working frequency band and any service mode of the ODU can be implemented.

Figure 4:
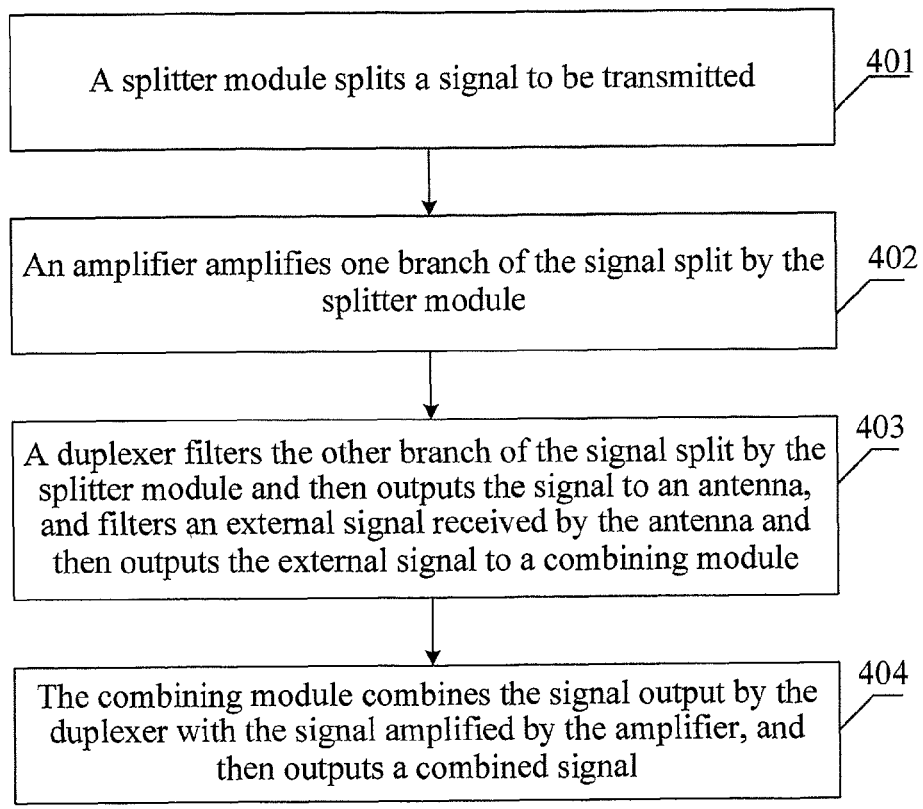
FIG. 4 is a flow chart of a radio frequency signal loopback method according to an embodiment of the present invention.

Referring to FIG. 4, an embodiment of the present invention provides a radio frequency loopback method, and the method includes:

Step 401: A splitter module splits a signal to be transmitted.

The splitter module is a first coupler or a first power divider; and a combining module is a second coupler or a second power divider.

Step 402: An amplifier amplifies one branch of the signal split by the splitter module.

The amplifier may be any amplifier, for example, may be a low-noise amplifier.

Step 403: A duplexer filters the other branch of the signal split by the splitter module and then outputs the signal to an antenna, and filters an external signal received by the antenna and then outputs the external signal to the combining module.

It should be noted that, the step that the duplexer filters the external signal from the antenna and then outputs the signal to the combining module, step 401, step 402, and the step that the other branch of signal split by the splitter module is filtered and then output to the antenna in step 403 have no time sequence.

Step 404: The combining module combines the signal output by the duplexer with the signal amplified by the amplifier, and then outputs a combined signal.

A specific manner in which the combining module combines the signal output by the duplexer with the signal amplified by the amplifier may be: The combining module couples the signal output by the amplifier to an output signal line of the duplexer, and the output signal line of the duplexer is originally configured to transfer the external signal received by the antenna. In this step, the signal output by the amplifier is coupled to the output signal line of the duplexer, so that an ODU may receive an external signal and a radio frequency loopback signal through the signal line. Since the external signal and the signal that is output by the amplifier have different frequencies, the ODU may distinguish, through different frequencies, which one is an external signal and which one is a signal looped back by the amplifier.

In order to control a gain of the amplifier, after receiving an ODU radio frequency loopback command, a control module controls magnitude of a power supply current of the amplifier according to a current service mode. If the current service mode requires larger power of a signal that is looped back to a receiving module, the power supply current of the amplifier is controlled to become larger, and in this way, the gain of the amplifier becomes larger, and correspondingly, the power of the signal looped back to the receiving module is larger.

In this embodiment of the present invention, the splitter module splits the signal transmitted by the transmitting module into two branches, where one branch of the signal is input to the amplifier, and the other branch of the signal is input to the duplexer. The amplifier amplifies the signal from the splitter module, and then the combining module couples the signal output by the amplifier to the output signal line of the duplexer, so that loopback of a signal at any frequency in a working frequency band and any service mode of the ODU can be implemented.

Persons of ordinary skill in the art may understand that all or part of steps in the method in the preceding embodiments may be implemented by a program instructing relevant hardware, and the program may be stored in a computer readable storage medium, such as a Read-Only Memory, a magnetic disk, or an optical disk.

The radio frequency signal loopback method and outdoor unit that are provided in the embodiments of the present invention are described in detail in the preceding. A principle and an implementation manner of the present invention are described in this specification through specific examples. The preceding description of the embodiments is merely used for helping understand the method and core idea of the present invention. Meanwhile, Persons of ordinary skill in the art may make variations to the specific implementation manner and application scope according to the idea of the present invention. In conclusion, contents of this specification shall not be construed as a limitation to the present invention.

What is claimed is:

1. An outdoor unit (ODU) comprising: a transmitter, a receiver, a splitter, a combiner, a duplexer, an amplifier, a controller, a power source, and a switch; wherein
   the transmitter is configured to transmit a signal;
   the splitter is configured to split the signal transmitted by the transmitter into two branches, wherein one branch of the signal is input to the amplifier, and the other branch of the signal is input to the duplexer;
   the amplifier is configured to amplify the signal from the splitter;
   the controller is configured to output a control signal to the switch in response to receipt of an ODU radio frequency loopback command, so that the power source supplies power to the amplifier, and output a control signal to the switch in response to receipt of an ODU radio frequency loopback removal command, so that the switch turns off power that is supplied by the power source to the amplifier;
   the controller is further configured to control a magnitude of a power supply current of the amplifier according to a current service mode after receiving the ODU radio frequency loopback command;
   the duplexer is configured to filter the signal from the splitter and then output the filtered signal to an antenna, and filter an external signal received by the antenna and then output the filtered external signal to the combiner;

the combiner is configured to combine a signal output by the amplifier with the filtered external signal output by the duplexer, and output a combined signal to the receiver, wherein the signal output by the amplifier and the filtered external signal output by the duplexer have different frequencies; and the receiver is configured to receive the combined signal output by the combiner.

2. The outdoor unit according to claim 1, wherein, the duplexer comprises a receive filter and a transmit filter;

the transmit filter is configured to filter the signal from the splitter and then output the filtered signal to the antenna; and the receive filter is configured to filter the external signal received by the antenna and then output the filtered external signal to the combiner.

3. A radio frequency signal loopback method, comprising:

splitting, by a splitter, a signal to be transmitted;

amplifying, by an amplifier, one branch of the signal split by the splitter;

outputting, by a controller, a control signal to a switch in response to receipt of an outdoor unit (ODU) radio frequency loopback command, so that the power source supplies power to the amplifier;

outputting, by the controller, a control signal to the switch in response to receipt of an ODU radio frequency loopback removal command, so that the switch turns off power that is supplied by the power source to the amplifier;

controlling, by the controller, a magnitude of a power supply current of the amplifier according to a current service mode after receiving the ODU radio frequency loopback command;

filtering, by a duplexer, the other branch of the signal split by the splitter and then outputting the filtered signal to an antenna, and filtering an external signal received by the antenna and then outputting the filtered external signal to a combiner; and combining, by the combiner, the signal output by the duplexer with the filtered external signal amplified by the amplifier, and then outputting a combined signal, wherein the signal output by the duplexer and the filtered external signal amplified by the amplifier have different frequencies.

4. The outdoor unit according to claim 1, wherein the controller is configured to increase the power supply current of the amplifier if the current service mode requires larger power of a signal that is looped back to the receiver after receiving the ODU radio frequency loopback command.

5. The method according to claim 3, wherein controlling a magnitude of a power supply current of the amplifier according to a current service mode after receiving the ODU radio frequency loopback command comprises:

increasing, by the controller, the power supply current of the amplifier if the current service mode requires larger power of a signal that is looped back to a receiver after receiving the ODU radio frequency loopback command.

* * * * *